United States Patent [19]
Benoit et al.

[11] Patent Number: 6,007,153
[45] Date of Patent: Dec. 28, 1999

[54] HINGE MECHANISM FOR A VEHICLE SEAT, AND A VEHICLE SEAT FITTED WITH SUCH A MECHANISM

[75] Inventors: Jean-Romain Benoit, Flers; Yann Reubeuze, Landigou, both of France

[73] Assignee: Bertrand Faure Equipements S.A., Boulogne, France

[21] Appl. No.: 09/116,398

[22] Filed: Jul. 16, 1998

[30] Foreign Application Priority Data

Jul. 17, 1997 [FR] France .................................. 97 09085

[51] Int. Cl.⁶ .............................. B60N 2/20; B60N 2/22
[52] U.S. Cl. ...................... 297/378.12; 297/367; 297/363
[58] Field of Search .................................. 297/363, 364, 297/365, 367, 378.12

[56] References Cited

U.S. PATENT DOCUMENTS

| | | | |
|---|---|---|---|
| 5,755,491 | 5/1998 | Baloche et al. | 297/362 |
| 5,788,325 | 8/1998 | Ganot | 297/367 |
| 5,820,219 | 10/1998 | Rohee | 297/367 |

FOREIGN PATENT DOCUMENTS

| | | |
|---|---|---|
| 27 45 539 | 4/1979 | Germany . |
| 197 02 123 | 10/1997 | Germany . |
| 197 28 169 | 4/1998 | Germany . |
| 298 02 274 | 5/1998 | Germany . |

OTHER PUBLICATIONS

WPIL Derwent Data Base abstract corresponding to DE 298 02 274.
WPIL Derwent Data Base abstract corresponding to DE 197 28 169.
WPIL Derwent Data Base abstract corresponding to DE 27 45 539.

*Primary Examiner*—Anthony D. Barfield
*Attorney, Agent, or Firm*—Marshall, O'Toole, Gerstein, Murray & Borun

[57] ABSTRACT

A hinge mechanism has a fixed cheek-plate and a pivoting cheek-plate that can be prevented from moving relative to the fixed cheek-plate by toothed slugs under the control of a cam. Between the two cheek-plates, there is disposed a circular guide having radial gaps which receive the slugs and which hold them in a retracted position once they have become disengaged from the radial gaps. The circular guide can be prevented from moving relative to the pivoting cheek-plate by actuating a control plate which disengages the slugs from the gaps. The pivoting cheek-plate can thus turn freely in one direction and then in the opposite direction before locking again in its initial angular position once the radial gaps of the circular guide come back into register with the slugs.

15 Claims, 11 Drawing Sheets

HINGE MECHANISM FOR A VEHICLE SEAT, AND A VEHICLE SEAT FITTED WITH SUCH A MECHANISM

FIELD OF THE INVENTION

The present invention relates to hinge mechanisms for vehicle seats, and to vehicle seats fitted with such mechanisms.

More particularly, the invention relates to a hinge mechanism for fitting to a vehicle seat comprising a seat proper and a seat-back that is pivotable relative to the seat proper, the mechanism comprising:

first and second cheek-plates, one for securing to the seat proper and the other to the seat-back, said cheek-plates being pivotally mounted relative to each other about an axis of rotation, the second cheek-plate being permanently secured with a set of teeth extending over at least an arc of a circle centered on the axis of rotation and being radially inwardly directed;

at least one locking slug provided with a set of teeth suitable for co-operating with the teeth of the second cheek-plate, said locking slug being guided in radial sliding by a guide secured to the first cheek-plate, to slide between an engaged position in which the teeth of the locking slug co-operate with the teeth of the second cheek-plate to lock the mechanism, and a retracted position in which the teeth of the locking slug do not co-operate with the teeth of the second cheek-plate, said locking slug also including a first peg which projects axially towards the second cheek-plate;

a locking cam for controlling the sliding of the locking slug, said locking cam being urged by resilient means towards a rest position in which said locking cam places the locking slug in its engaged position;

a first control member for moving the locking cam from its rest position towards an actuation position in which said locking cam enables the locking slug to slide towards its retracted position;

means for displacing the locking slug from its engaged position to its retracted position when the locking cam passes from its rest position to its actuation position; and a circular guide mechanically linked to the second cheek-plate and co-operating with the first peg so as to hold the first slug positively in its retracted position when said locking slug is in a predetermined range of angular positions relative to said circular guide, said circular guide having at least one gap in which the first peg can engage when the locking slug is not in said predetermined range of angular positions, then allowing the locking slug to slide radially outwards to its engaged position.

BACKGROUND OF THE INVENTION

Document EP-A-0 770 514 describes an example of such a hinge mechanism which is capable of remaining unlocked while the seat-back is being tilted down forwards, even after the control member has been released, e.g. to access the back seats of the vehicle if the mechanism in question is mounted on a front seat of a two-door motor vehicle. When the seat-back is subsequently raised, the mechanism automatically locks itself again when the peg comes into register with the corresponding gap in the circular guide.

The mechanism described in that document gives full satisfaction, but it nevertheless suffers from the drawback of always locking itself in the same angular position for the seat-back when it is raised after being tilted down forwards, with this happening regardless of the position into which the seat-back had previously been adjusted.

The user of the seat must therefore readjust the inclination of the seat-back each time it is raised after being tilted down forwards.

Document EP-A-0 694 434 also describes a hinge mechanism, said mechanism having toothed slugs and enabling the seat-back to be tilted down forwards and to lock itself automatically again in its previously-adjusted position. The toothed slugs of that mechanism which serve to adjust the inclination of the seat-back engage in a set of teeth which is itself movable relative to the second cheek-plate and which can be secured to the second cheek-plate by means of other toothed slugs.

Under such circumstances, the two cheek-plates are connected together via two stages of toothed slugs, thereby tending to reduce the mechanical strength of the hinge, or making it necessary to increase the weight and the cost of the hinge mechanism in order to obtain high mechanical strength.

OBJECTS AND SUMMARY OF THE INVENTION

An object of the present invention is therefore to provide a hinge mechanism of the kind described in document EP-A-0 770 514, but capable of locking automatically in the most-recently adjusted position of the seat-back when it is raised after being tilted down forwards, while also being just as strong as the mechanism of document EP-A-0 770 514.

To this end, according to the invention, in a hinge mechanism of the kind in question:

the circular guide is formed by a rim belonging to "memory" equipment which is pivotally mounted relative to the first and second cheek-plates to pivot about the axis of rotation;

the gap of the circular guide forms a radial guide in which the first peg can slide radially, substantially without play in the circumferential direction;

the memory equipment further includes a "memory" plate and a "memory" slug, said slug being mounted to slide radially on the memory plate between an engaged position in which said memory slug co-operates with said second cheek-plate to prevent the memory plate from moving relative to said second cheek-plate, and a retracted position in which said memory slug does not co-operate with the second cheek-plate and allows the memory plate to turn freely relative to said second cheek-plate;

a control plate is pivotally mounted about the axis of rotation to pivot between a rest position which is fixed relative to the first cheek-plate and an active position, said control plate being resiliently urged towards its rest position and being capable of being moved into its active position by a second control member, and said control plate being shaped to enable the locking slug to move radially inwards to a "disengagement" position in which the first peg can disengage from its radial guide to slide against the circular guide when the control plate is placed in its active position, the control plate being connected to the locking cam with a certain amount of angular clearance, so that said control plate remains in its rest position while the locking cam is moved from its rest position to its active position by the first control member, and so that said control plate entrains the locking cam to its active position when said control plate is moved from its rest position to its active position by the second control member, means being provided to entrain the locking slug from its engaged position to its disengagement position when the control plate is displaced from its rest position to its active position, after a certain amount of angular lost motion in which displacement of the control plate does not entrain displacement of the locking slug;

the control plate is secured to a "memory" cam which co-operates with the memory slug to place said memory slug in its retracted position when said control plate is in its rest position, and to enable said memory slug to move into its engaged position during the angular lost motion of the control plate; and the memory slug is urged resiliently towards its engaged position.

By means of these dispositions, when the user of the seat seeks to adjust the inclination of the seat-back, the user acts on the first control member, thereby conventionally releasing the locking slug, which slug then retains the memory plate together with the memory slug carried by said plate.

In contrast, when the user of the seat seeks to tilt the seat-back down forwards as far as it will go, in particular to gain access to the back seats of the vehicle, said user acts on the second control member, thereby not only releasing the locking slug, but also enabling the first peg of said slug to disengage itself from the radial guide. Simultaneously, the memory slug engages the second cheek-plate, locking the memory plate in the position corresponding to the most recently-adjusted position of the seat-back.

When the seat-back is tilted down forwards, the circular guide belonging to the memory equipment slides against the first peg of the locking slug, holding said locking slug in its retracted position even after the second control member has been released.

Thereafter, when the seat-back is tilted upwards and rearwards, the circular guide slides again against the first peg, until the first peg is in register with its radial guide, into which it engages, thereby enabling the locking slug to come back into engagement with the teeth of the second cheek-plate: the seat-back is then again locked in the position as initially adjusted by the user.

In preferred embodiments of the invention, use may optionally also be made of one or more of the following dispositions:

the control plate includes a stop member which co-operates with the locking slug to prevent the locking slug from moving to its disengagement position so long as said control plate is in its rest position;

a spring is mounted on the memory plate to urge the memory slug towards its engaged position;

the locking cam is secured to a rigid plate which extends radially between said cam and the second cheek-plate overlying at least a portion of the locking slug, the locking slug having a second peg projecting axially towards the second cheek-plate and penetrating in a cutout formed in said plate, said cutout being defined radially outwardly by a camming edge which co-operates with the second peg to move the locking slug radially inwards to the retracted position of the locking slug when the locking cam is moved to its active position by the first control member, and to the disengagement position of the locking slug when the control plate is moved to its active position by the second control member;

the control plate includes at least one drive finger which penetrates axially into the cutout of the rigid plate towards the first cheek-plate, said drive finger thus connecting the control plate to the locking cam with the above-mentioned angular clearance;

the drive finger is disposed in register with the second peg of the locking slug, radially on the inside of said second peg when the control plate is in its rest position in such a manner that the second peg of the locking slug comes into abutment against the drive finger, thereby preventing the locking slug from moving radially inwards to its disengagement position so long as the control plate is in its rest position;

the drive finger is disposed to come angularly into abutment against the second peg of the locking slug when the locking slug is in the disengagement position, and when the second control member is released, then preventing the control plate and the locking cam from returning towards their respective rest positions;

an element secured to the locking cam is provided to come angularly into abutment against the locking slug when the slug is in its disengagement position and the second control member is released, so as then to prevent said locking cam from returning towards its rest position;

cam means are provided to urge the locking slug radially outwards when the slug is in its disengagement position and the second control member is released, so as to enable the first peg of said slug to engage in its radial guide when the seat-back is raised after being folded down forwards;

the memory slug is in the form of a plate which extends in a generally radial plane in common with the memory plate, the circular guide having both a first portion which is secured to the memory slug and a second portion which is angularly complementary to the first portion and which is secured to the memory plate, said first and second portions of the circular guide being at equal distances from the axis of rotation when the memory slug is in its engaged position;

the circular guide has an abutment projecting radially inwards at the gap of said circular guide, from one side only of said gap so that when the locking slug is in its disengagement position, the second cheek-plate can pivot in a first angular direction and then in an opposite, second angular direction until the first peg of the locking slug encounters said abutment of the circular guide, after which said first peg can again be engaged in its radial guide;

a spring which urges the second control member towards a position which corresponds to the rest position of the control plate; and the memory slug has a set of teeth which is adapted, when said memory slug is in its engaged position, to co-operate with a complementary set of teeth belonging to the second cheek-plate.

The invention also provides a vehicle seat comprising a seat proper and a seat-back pivotally mounted on the seat proper by means of at least one hinge mechanism as defined above, in which one of the first and second cheek-plates of the hinge is secured to the seat proper and the other is secured to the seat-back.

Advantageously, the seat-back is mounted on the seat proper by means of two hinge mechanisms disposed on either side of the seat, namely a first hinge mechanism as defined above, having its first and second cheek-plates secured one to the seat proper and the other to the seat-back, and secondly a second hinge mechanism which comprises:

first and second cheek-plates, one secured to the seat proper and the other to the seat-back, said cheek-plates being mounted to pivot relative to each other about the above-mentioned axis of rotation, the second cheek-plate of the second hinge mechanism being permanently secured to a set of teeth extending over at least an arc of a circle centered on the axis of rotation and having teeth that are radially inwardly directed;

at least one locking slug provided with a set of teeth suitable for co-operating with the teeth of the second cheek-plate of the second hinge mechanism, said locking slug being guided in radial sliding relative to the first cheek-plate of the second hinge mechanism between an engaged position where the teeth of the locking slug of the second hinge mechanism co-operate with the teeth of the second cheek-plate of the second hinge mechanism to lock said second hinge mechanism, and a retracted position in which said teeth of the locking slug do not co-operate with said teeth of the second cheek-plate;

a locking cam to control sliding of the locking slug of the second hinge mechanism, said locking cam being connected to the locking cam of the first hinge mechanism by a rigid link bar and being urged by resilient means towards a rest position in which said locking cam of the second hinge mechanism places the locking slug of the second hinge mechanism in its engaged position, said rest position corresponding to the rest position of the locking cam of the first hinge mechanism; and means for moving the locking slug of the second hinge mechanism from its engaged position to its retracted position when the locking cam of the second hinge mechanism passes from its rest position to an actuation position which corresponds to the actuation position of the locking cam of the first hinge mechanism.

BRIEF DESCRIPTION OF THE DRAWINGS

Other characteristics and advantages of the invention appear from the following description of an embodiment thereof, given by way of non-limiting example and with reference to the accompanying drawings.

In the drawings.

MORE DETAILED DESCRIPTION

In the various figures, the same references designate elements that are identical or similar.

Figure 1:
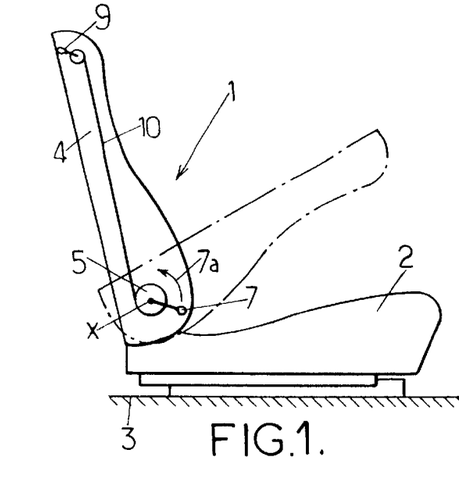
FIGS. 1 and 2 are respectively a side view and a rear view of a vehicle seat constituting an embodiment of the invention.
Figure 2:
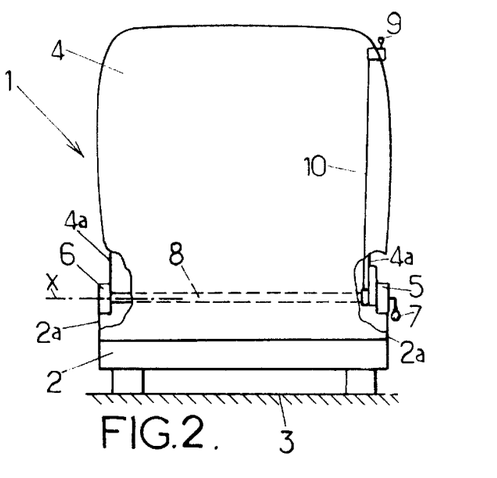

As shown diagrammatically in FIGS. 1 and 2, the invention relates to a vehicle seat 1, in particular a motor vehicle front seat comprising firstly a seat proper 2 mounted on the floor 3 of the vehicle and secondly a seat-back 4 pivotally mounted on the seat proper 2 about a transverse horizontal axis X.

More precisely, in the example shown, the strength-member 4a of the seat-back is connected to the strength-member 2a of the seat proper on either side of the seat via first and second hinge mechanisms 5, 6 which are controlled by a single handle 7 situated on one side of the seat, and which are connected to each other by a rigid link bar 8 which extends horizontally and transversely relative to the seat.

When a passenger of the seat actuates the handle, causing it to turn in angular direction 7a, both hinge mechanisms 5 and 6 are unlocked simultaneously. The passenger can then adjust the inclination of the seat-back 4 by acting directly thereon, e.g. by pushing back into the seat-back so as to push the seat-back rearwards, or on the contrary by leaving the seat-back free to advance forwards under the effect of one or more springs (not shown) hidden beneath the padding of the seat.

It is also possible for the seat-back 4 to be folded down completely in a forwards direction, into the position shown by chain-doted lines in FIG. 1 by acting on a handle 9 which may be located, for example, on one side of the seat-back and which can be connected to the hinge mechanism 5 specifically via a cable 10.

Figure 3:
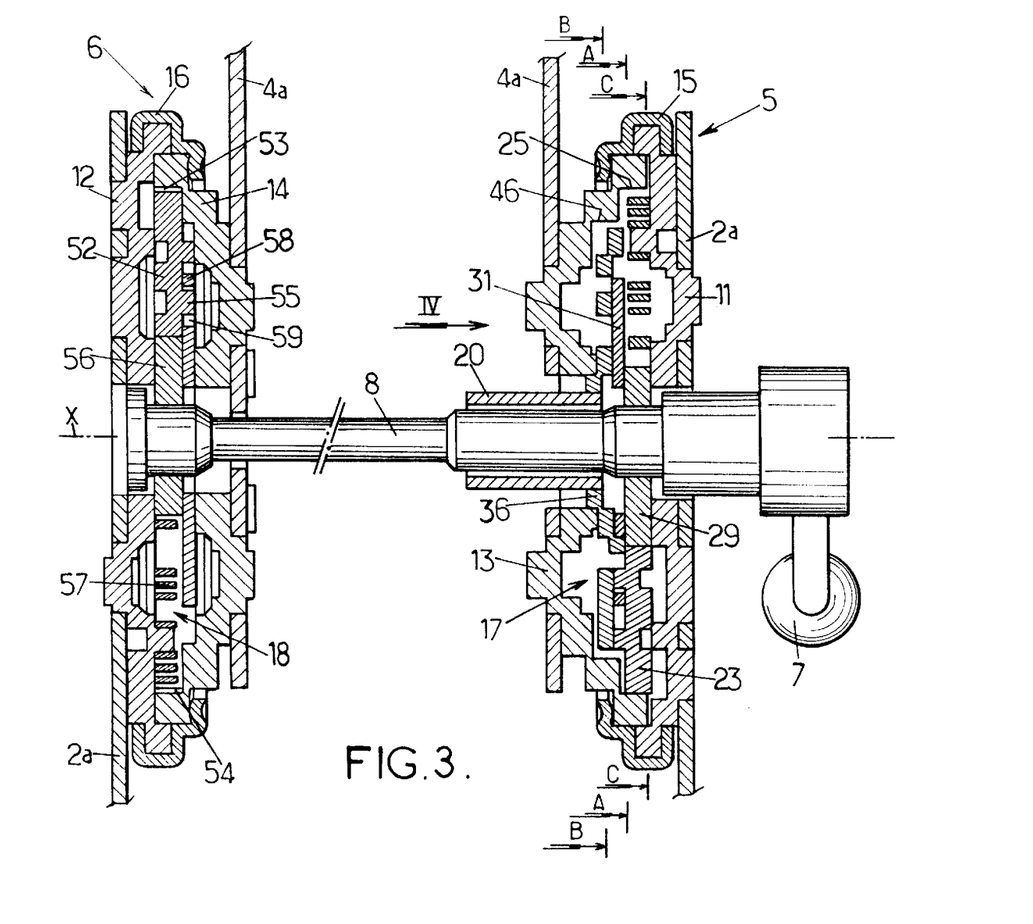
FIG. 3 is a vertical section view showing first and second hinge mechanisms interconnecting the seat-back and the seat proper of FIGS. 1 and 2.

As shown in more detail in FIG. 3, each of the hinge mechanisms 5, 6 comprises:

a respective fixed metal cheek-plate 11, 12 secured to the strength-member 2a of the seat proper;

a respective moving metal cheek-plate 13, 14 secured to the strength-member 4a of the seat-back;

a respective metal ring 15, 16 crimped around the periphery of the fixed and moving cheek-plates, and co-operating therewith to define a closed circular box; and a respective locking device 17, 18 contained inside the corresponding box and adapted to lock the moving cheek-plate relative to the corresponding fixed cheek-plate so long as neither of the two handles 7, 9 is actuated.

Figure 4:
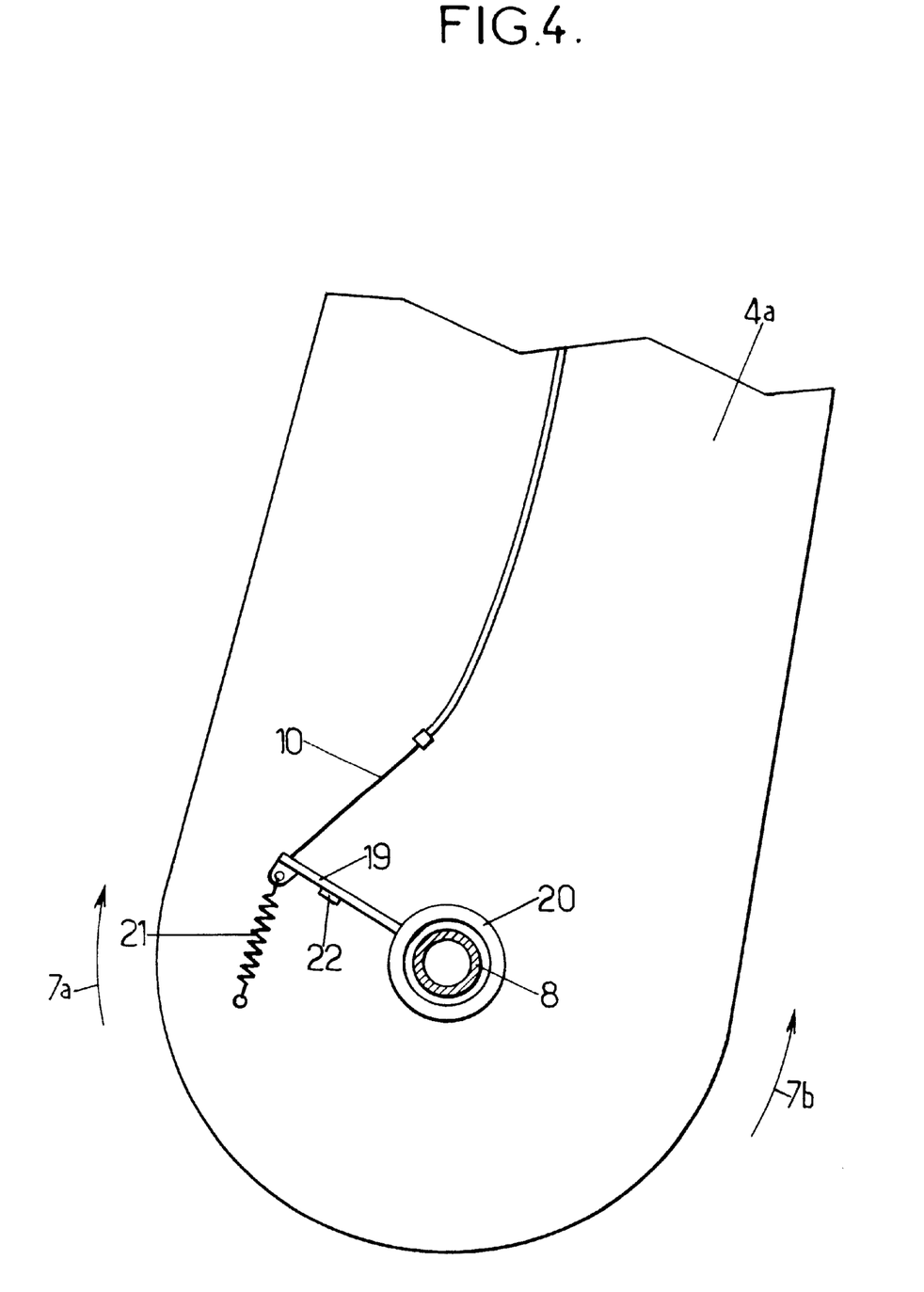
FIG. 4 is a detail view along direction IV of FIG. 3.

The handle 7 is preferably secured to the link bar 8 so as to drive both locking devices 17 and 18 directly, while the handle 9 is preferably connected by means of a cable 10 (as can be seen in FIG. 4) to a lever arm 19 that is secured to a tube 20 which surrounds the link bar 8 and which controls locking device 17 only, as explained below.

Advantageously, the lever 19 is urged in an angular direction 7b opposite to the above-mentioned direction 7a by a spring 21 mounted between said lever 19 and the strength-member 4a of the seat-back, said spring 21 normally holding the lever 17 to bear against an abutment 22 which is secured to the strength-member 4a of the seat-back.

Figure 5:
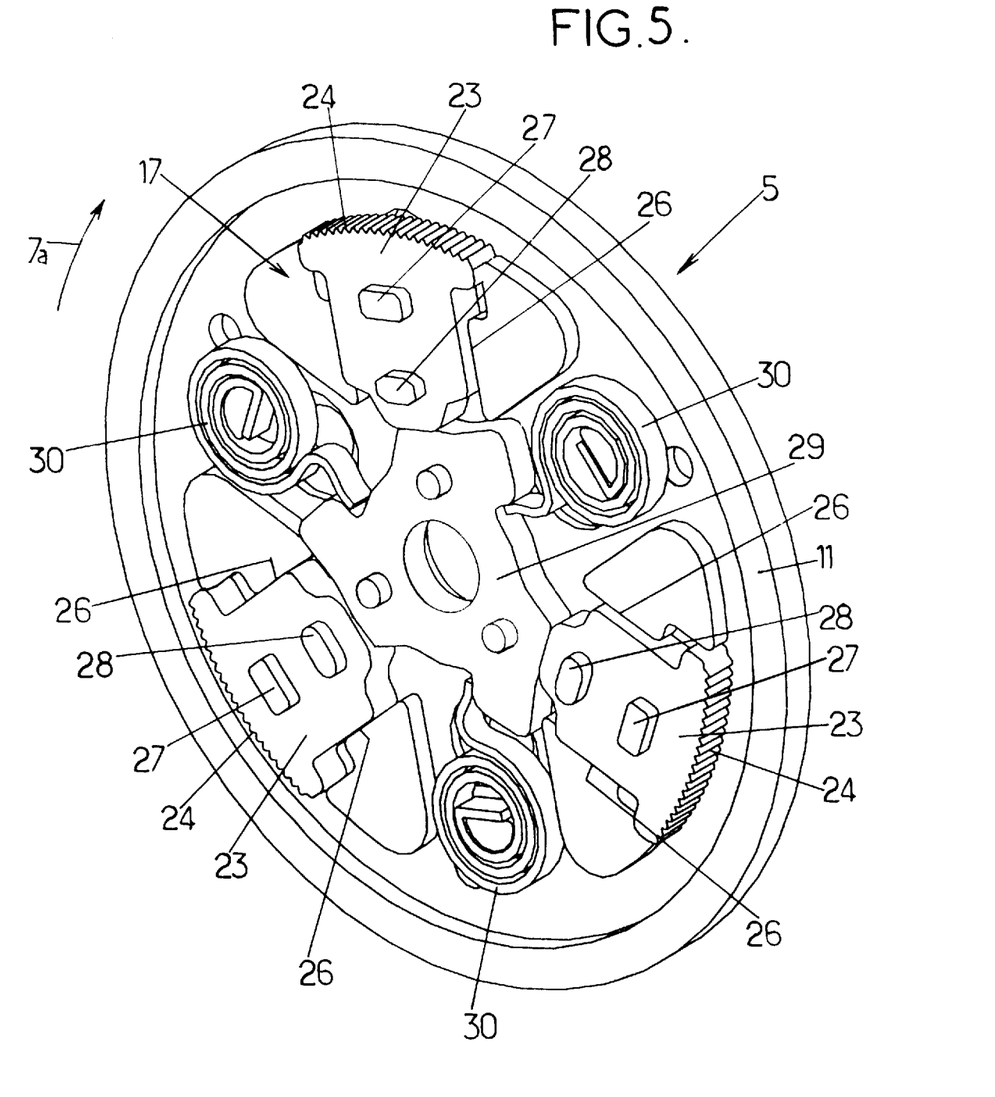
FIGS. 5 to 7 are perspective views showing the first hinge mechanism of the seat of FIGS. 1 and 2 in various stages of assembly.
Figure 6:
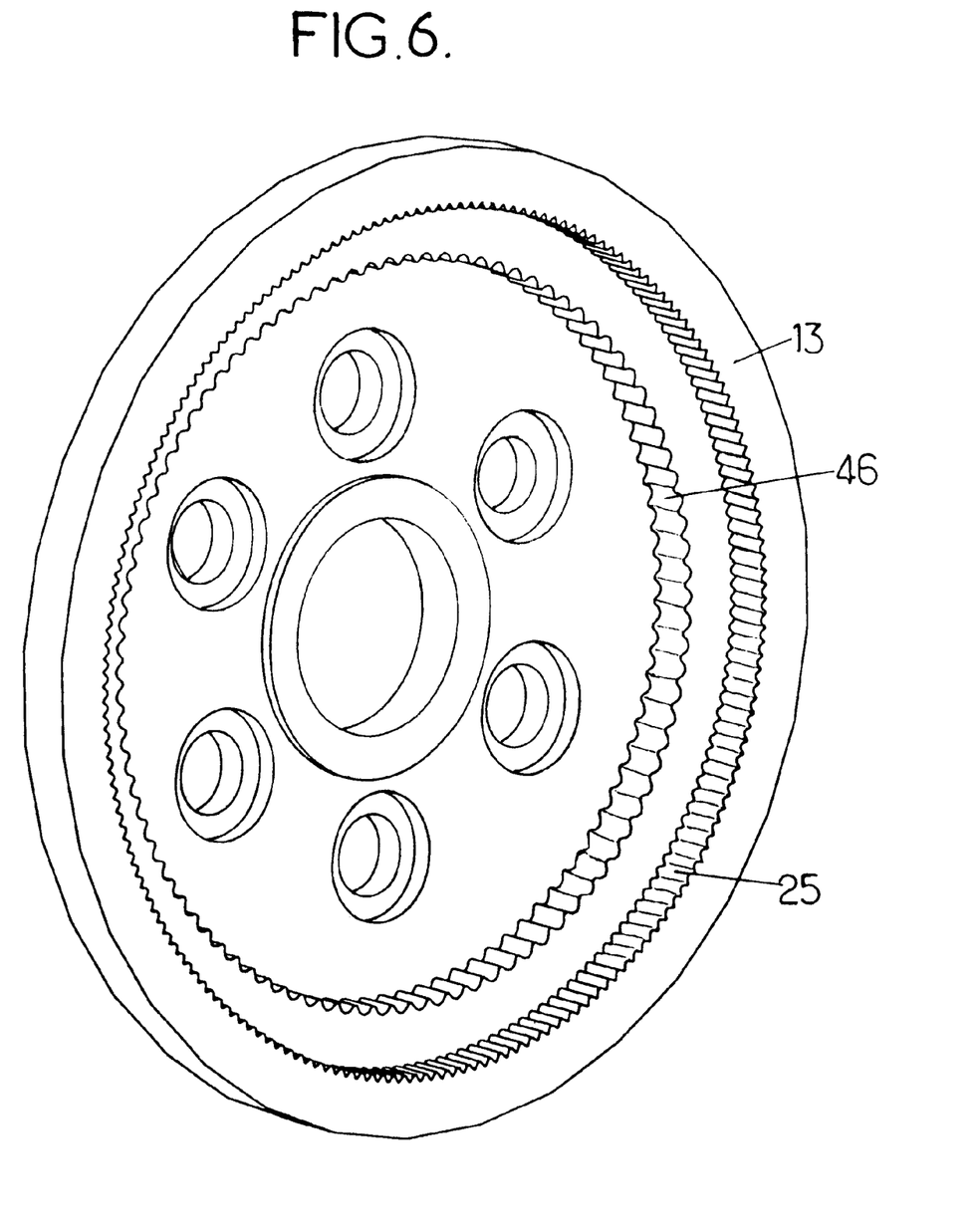

As shown in FIGS. 5 and 6, the first hinge mechanism 5 comprises, in conventional manner:

three metal locking slugs 23, disposed at 120° to one another and each having a set of outwardly directed teeth 24 adapted to engage in a circular set of inwardly directed teeth 25 formed in the moving cheek-plate 13, each of the slugs being mounted to slide radially in a guide 26 secured to the fixed cheek-plate 11 between an engagement position in which the teeth 24 on the slug co-operate with the teeth 25 of the moving cheek-plate so as to lock the mechanism, and a retracted position in which the slug 23 does not co-operate with the teeth 25 of the moving cheek-plate, each of the slugs 23 also having first and second pegs 27, 28 projecting axially towards the moving plate 13, the two pegs 27, 28 being, for example, in radial alignment with the peg 28 being disposed radially inside the peg 27;

a metal "locking" cam 29 secured to the link bar 8 and the handle 7, serving to control sliding of the slugs 23; and springs 30 mounted on the fixed cheek-plates 11 and urging the cam 29 towards a rest position in which it places the slugs 23 in their engaged positions, said cam being capable of pivoting in angular direction 7a, in particular under drive from the handle 7 towards a "actuation" position in which it enables the slugs 23 to slide towards their retracted positions, thereby releasing the hinge mechanism 5.

Figure 7:
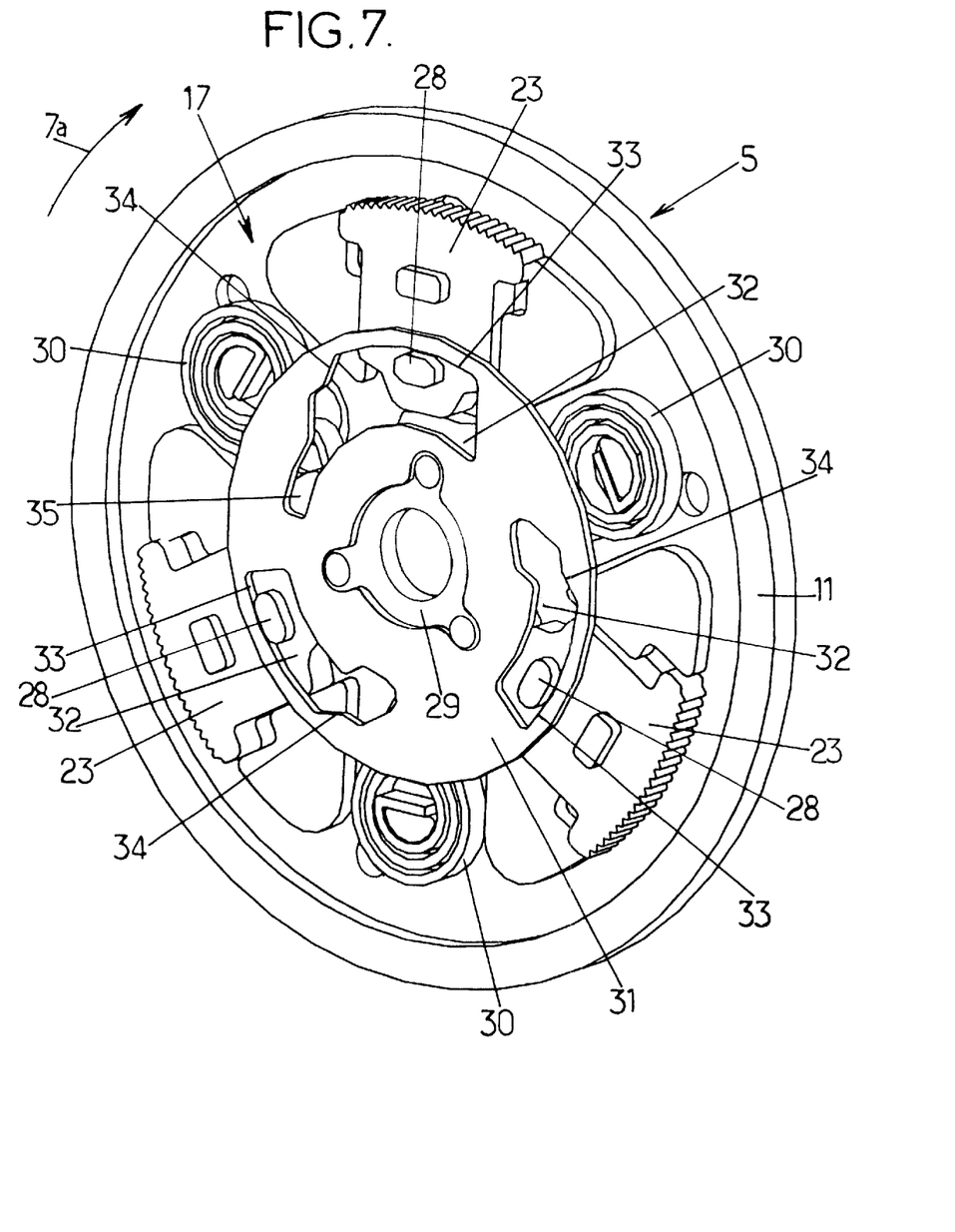

As shown in FIG. 7, the cam 29 is also secured to a rigid metal plate 31 which extends radially between said cam and the moving cheek-plate 13 and overlying all three slugs 23, in part.

Three cutouts 32 are formed in the plate 31, said cutouts receiving the pegs 28 of the slugs 23, with each of the pegs 28 co-operating with a camming edge 33 defined by the radially outer side of the corresponding cutout.

The camming edge 33 of each cutout has, at one end, a ramp 34 with one or more inclined segments, said ramp 34 being disposed so as to co-operate with the corresponding peg 28 when the cam 29 turns in direction 7a so as then to displace the corresponding slug 23 radially inwards.

The radially inner portion of one of the cutouts 32 is angularly extended by a notch 35 at the end of said cutout 32 which includes the ramp 34 (i.e. at the upstream end of the cutout relative to the direction 7a).

Figure 8:
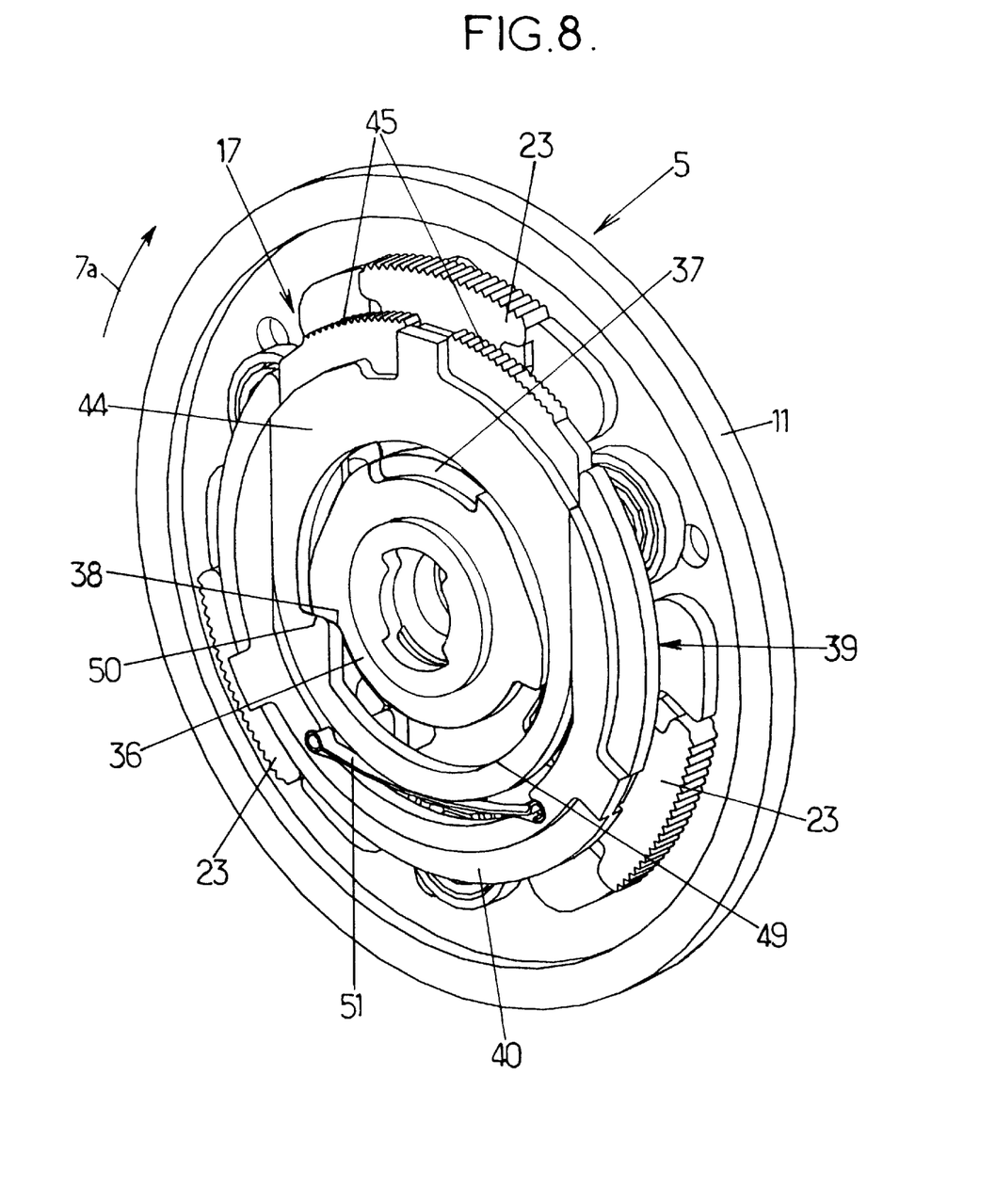
FIGS. 8 to 11 are perspective detail views showing various parts of the first hinge mechanism.
Figures 9, 10, 11:
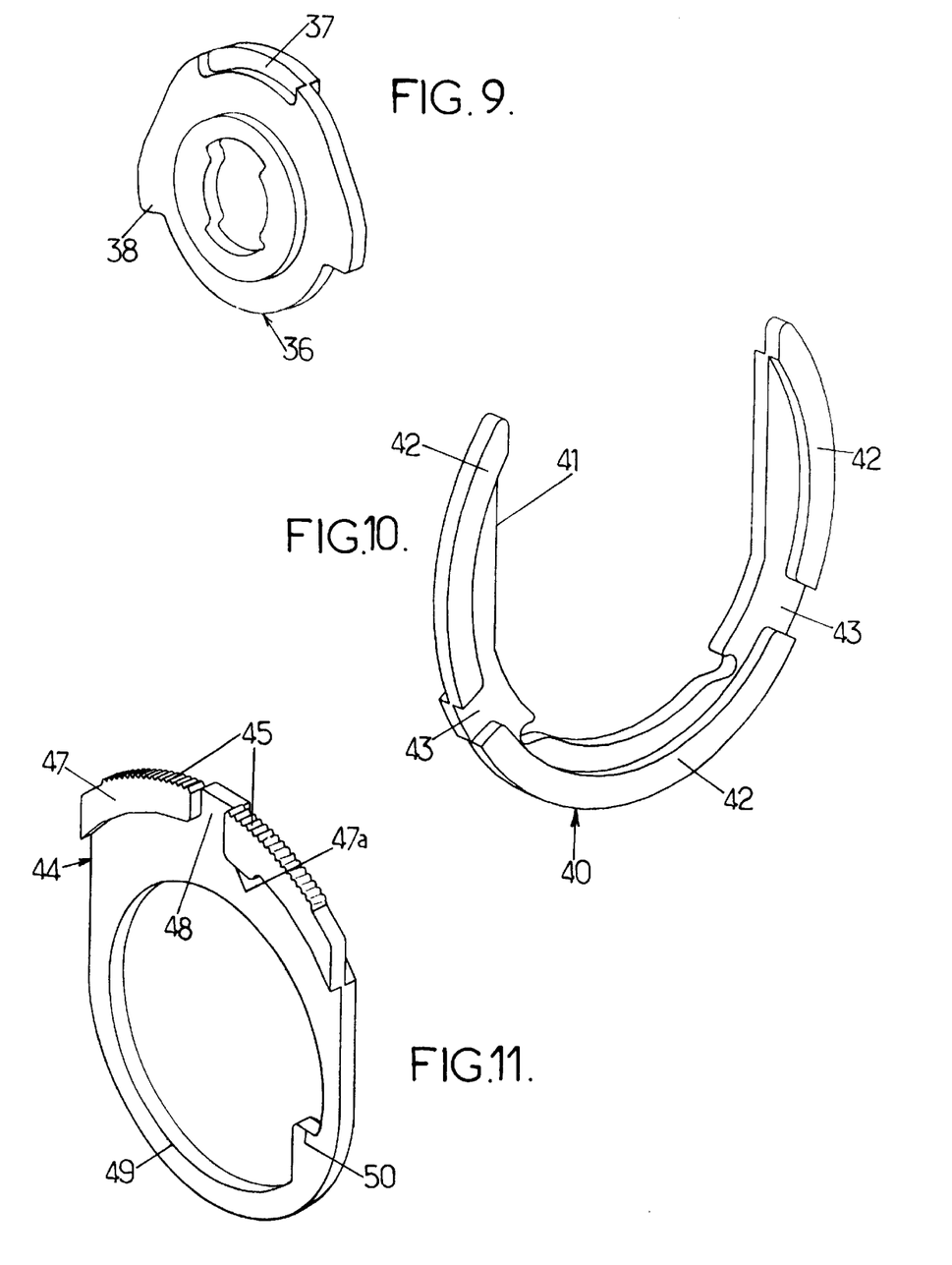

As shown in FIGS. 8 and 9, the locking device 15 of the hinge mechanism 5 also includes a metal control plate 36 which is secured to the tube 20 and which allows the link bar 8 to pass therethrough with clearance (see FIG. 3), said control plate extending radially in the center of the hinge mechanism 5 between the plate 31 and the moving cheek-plate 13.

The control plate 36 has an abutment member such as a drive finger 37 which projects axially towards the fixed cheek-plate 11 and which penetrates into the radially inner portion of the cutout 32 which has the notch 35, leaving little angular clearance in the direction 7a while having greater angular clearance in the opposite direction towards the notch 35. This control finger is in the form of a rim which is normally located in correspondence with the peg 28 engaged in the same cutout 32, and radially inside the peg.

In addition, the control plate 36 is provided with at least one camming edge 38 which projects radially outwards and which is referred to below as the "memory" cam.

Finally, as shown in FIGS. 8, 10, and 11, the locking device 15 also includes memory equipment 39 which extends in the same radial plane as the control plate 36, around said plate, and which includes:

a metal memory plate 40 having a circularly arcuate outer contour and cut out so as to be substantially U-shaped, defining a parallel-edged guide housing 41 opening radially outwards, said memory plate also having an outer rim 42 which projects axially towards the fixed cheek-plate 11 over the entire circular periphery of said plate 40, said rim 42 having two gaps 43 forming radial guides in which there are engaged with substantially no angular clearance the pegs 27 of the two slugs 23 which do not correspond to the cutouts 32 in which the drive finger 37 of the control plate penetrates;

a metal memory slug 44 which extends in the same radial plane as the plate 40 and which is mounted to slide radially in the guide 41 of said plate, the memory slug having an outer set of teeth 45 adapted to engage with an additional inwardly directed set of teeth 46 formed in the moving cheek-plate 13 (see FIG. 6), the memory slug 44 also having a circular outer rim 47 carrying the teeth 45 and disposed as an angular extension of the circular rim 42 of the memory plate when the teeth 45 of the memory slug are engaged with the teeth 46 of the moving cheek-plate, said rim 47 having a gap 48 which forms a radial guide in which there is normally engaged, substantially without angular clearance, the peg 27 which is disposed in register with the drive finger 37 of the control plate, said guide 48 being defined in part in the direction opposite the direction 7a by an abutment 47a which projects radially inwards, and the memory slug 44 having a central recess 49 which receives the control plate 36 and which includes a projection 50 projecting radially inwards and adapted to co-operate with the memory cam 38 of said control plate; and a spring 51 which is mounted on the memory plate 40 and which urges the memory slug 44 radially outwards towards a position in which the teeth on said slug engage in the teeth 46 of the moving cheek plate (the memory slug 40 optionally being returned by a camming action of the control plate 36 on said slug, in which case it is possible to omit the spring 51).

In addition, as shown in FIG. 3, the locking device 18 of the second locking mechanism 16 is a device of the same type as is already known in the prior art, and it comprises:

three locking slugs 52 (only one of which can be seen in FIG. 3) that are identical or similar to the slugs 23 described above, each provided with a set of outwardly directed teeth 53 suitable for co-operating with a circular set of inwardly directed teeth 54 of the moving cheek-plate 14, each of said locking slugs 52 being guided in radial sliding by a respective guide similar to the above-described guide 26, which is secured to the fixed cheek-plate 12 so that the slug 52 can slide between an engaged position in which it meshes with the teeth 54, and a retracted position in which it does not co-operate with said teeth 54, the slug also including at least one peg 55 similar to the above-mentioned peg 28;

a locking cam similar to above-mentioned cam 29 and secured to the link bar 8 so as to control sliding of the slugs 52;

springs 57 similar to the above-mentioned spring 30 mounted on the fixed cheek-plate 12 and urging the cam 56 towards a rest position in which said cam places the slugs 52 in their engaged positions, the rest positions of the two cams 29 and 56 corresponding mutually, and the cam 56 being capable of being displaced in the actuation direction 7a with the cam 29 to an actuation position in which said cam 56 enables the slugs 52 to slide radially inwards to their retracted positions; and a rigid plate 58 similar to above-mentioned plate 31 and secured to the cam 56, said plate 58 having three cutouts 59 in which the pegs 55 of the slugs are respectively engaged, each cutout 59 being defined radially outwards by a camming edge which acts on the corresponding peg 55 to move it radially inwards when the cam 56 turns towards its actuation position, thereby moving the slugs 52 towards their retracted positions.

The above-described device operates as follows.

When both hinge mechanisms 5 and 6 are in the rest position and the seat-back 4 is in its raised position, the locking cams 29, 56 of both mechanisms are in the rest position and they hold the locking slugs 23, 52 in their engaged positions, such that both hinge mechanisms lock the seat-back 4 relative to the seat proper 2.

In addition, in this position, the spring 21 holds the lever 19 pressed against the abutment 22, thereby placing the control plate 36 which is secured to the tube 20 and to the lever 19 in a rest position where the memory cam 38 of said control plate co-operates with the projection 50 on the memory slug 44 to hold said slug in a retracted position where it does not co-operate with the corresponding teeth 46.

Starting from this rest position, when a user seeks to adjust the inclination of the seat-back 4, the user moves the handle 7 in direction 7a, thereby entraining both locking cams 29, 56 into their actuation positions such that the locking slugs 23, 52 are moved into their retracted positions by the plates 31, 58: both hinge mechanisms 6 are therefore unlocked, thereby enabling the user to adjust the inclination of the seat-back 4 by acting directly on the seat-back.

Figure 12:
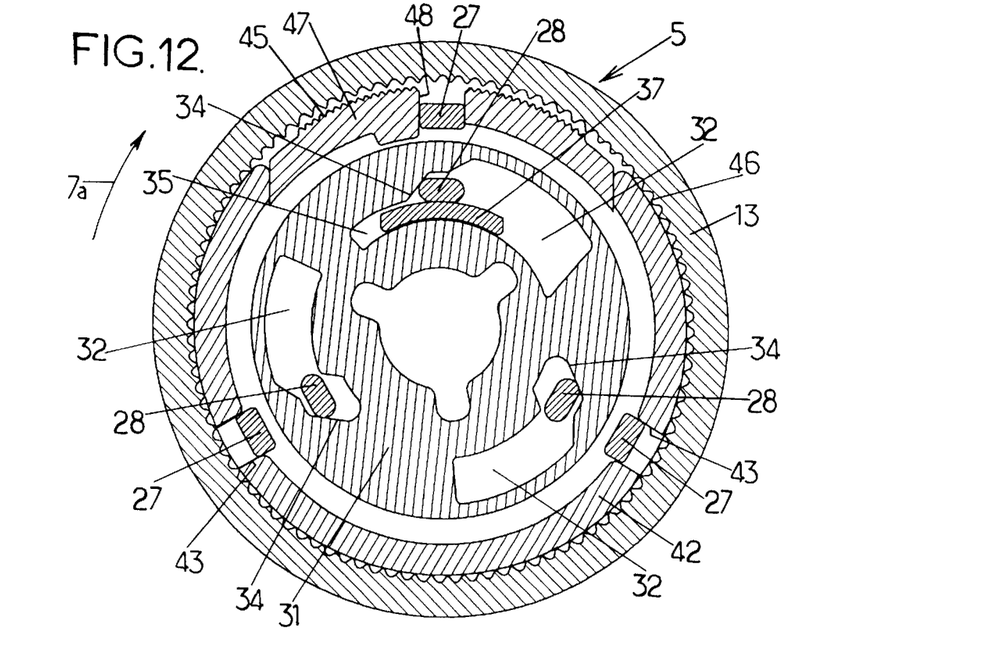
FIG. 12 is a section view on line A—A of FIG. 3, showing the first hinge mechanism during adjustment of the inclination of the seat-back.

In addition, as shown in FIG. 12, the control plate 36 remains stationary such that the drive finger 37 of said control plate remains in correspondence with the peg 28 engaged in the cutout 32 of the plate 31: the peg 28 therefore comes radially inwardly into abutment against the drive finger 37, thus limiting the displacement of the corresponding slug 23.

The peg 27 of the slug thus remains engaged in the radial guide 48 for the memory slug.

In addition, because the stroke of the above-mentioned peg 28 is interrupted, the peg 28 constitutes an abutment which prevents the plate 31 and the cam 29 from moving to an angular position in which the various pegs 28 are situated at the ends of the corresponding ramps 34, such that the pegs 27 of the other two locking slugs 23 also remain in their respective radial guides 43.

When the user adjusts the inclination of the seat-back, the pegs 27 thus retain the memory equipment 39 by preventing it from moving relative to the fixed cheek-plate 11 while the moving cheek-plate 13 is pivoting.

In contrast, when it is desired to tilt the seat-back 4 down forwards, e.g. to access the back seats of the vehicle if it is a two-door vehicle, then the lever 19 is pivoted together with the tube 20 by acting on the handle 9, thereby rotating the control plate 36 in angular direction 7a.

Figure 13:
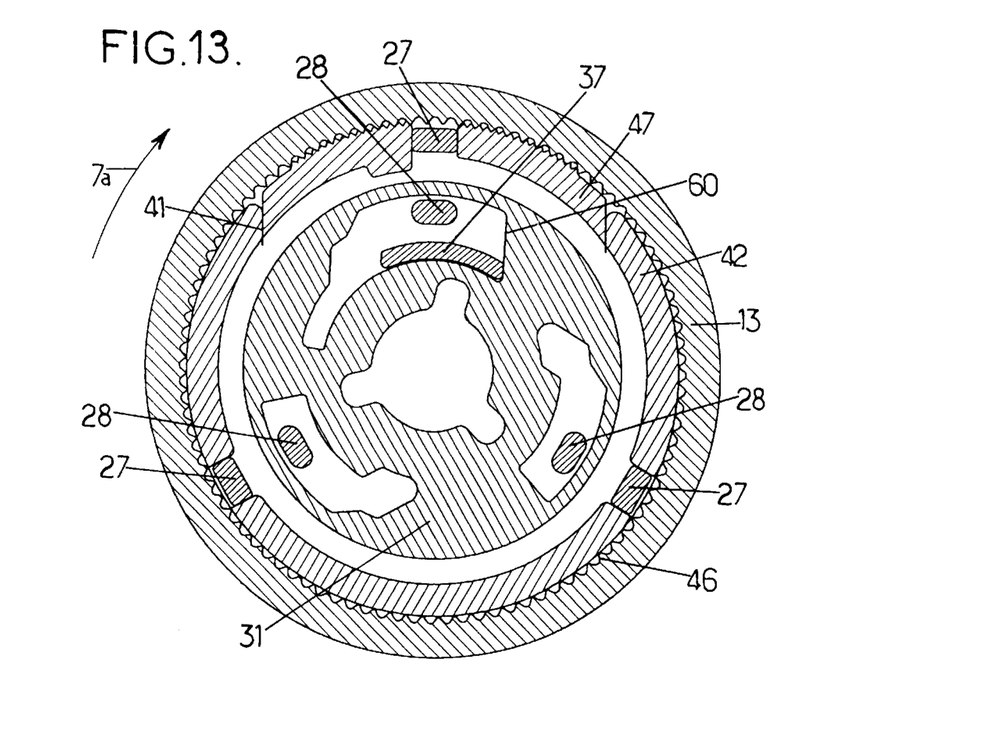
FIGS. 13 and 14 are section views respectively on lines A—A and B—B of FIG. 3 showing the first hinge mechanism when the control member which controls folding down forwards of the seat-back begins to be actuated.
Figure 14:
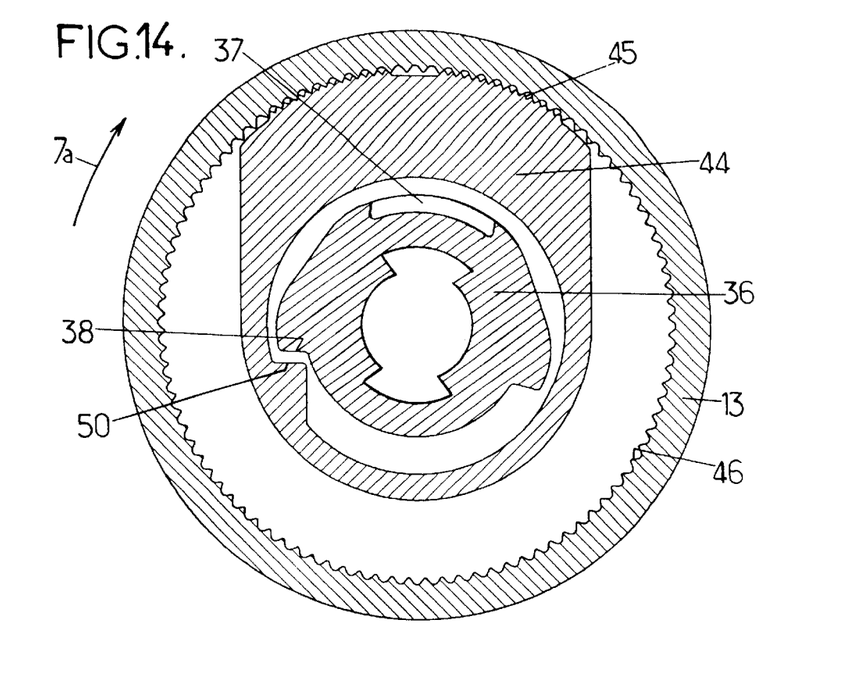

As shown in FIGS. 13 and 14, the control plate 36 is then moved firstly over a certain angular stroke in which the control finger 37 moves in angular direction 7a inside the corresponding cutout 32 until it comes into abutment against the end 60 of said cutout which is situated remote from the above-mentioned notch 35.

Simultaneously, the memory cam 38 of the control plate ceases to act on the projection 50 of the memory slug 44 (FIG. 14) such that the teeth 45 of said slug come into engagement with the teeth 46 of the moving plate 13 under drive from the above-mentioned spring 51.

Figure 15:
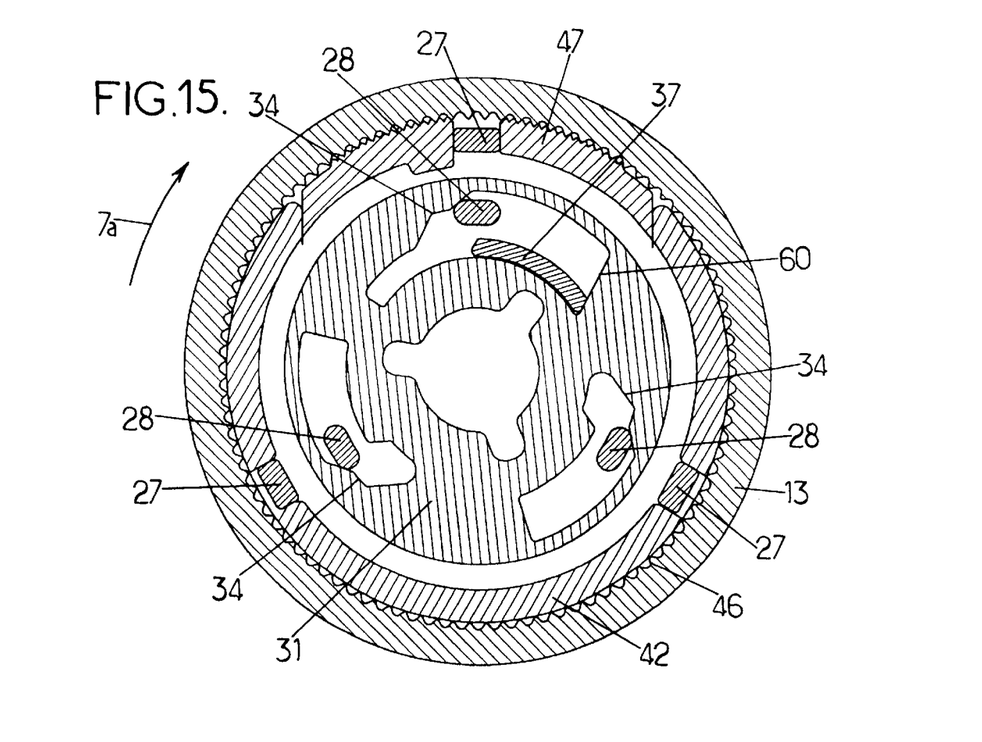
FIGS. 15 and 16 are section views respectively on lines A—A and C—C showing the first hinge mechanism when the control member which controls folding down forwards of the seat-back begins to be actuated, but at a stage later than the stage shown in FIGS. 13 and 14.
Figure 16:
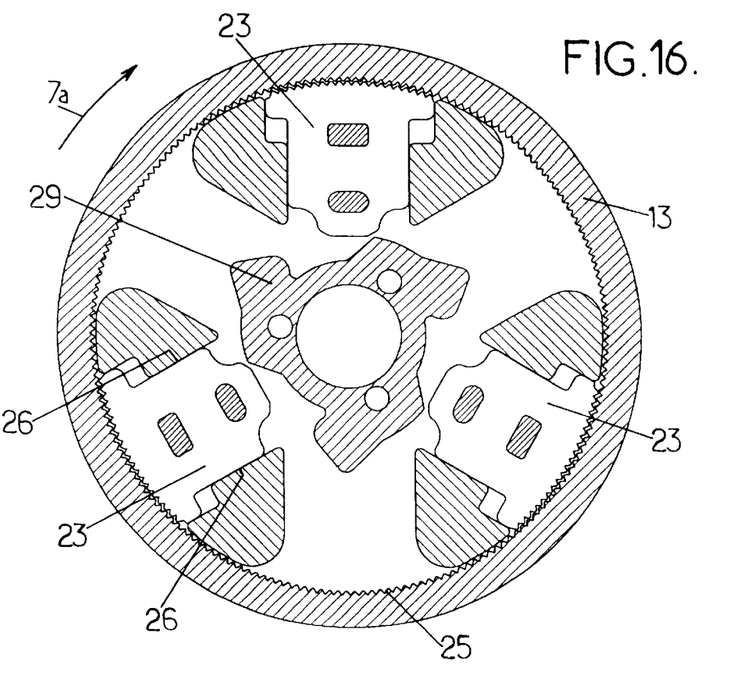

As the control plate 36 continues to pivot, as shown in FIGS. 15 and 16, the drive finger 37 of said control plate moves the plate 31 and the locking cam 29 in angular direction 7a, such that the locking slugs 23 slide radially inwards by co-operating between the ramps 34 of the cutouts 32 and the pegs 28 of said slugs.

The locking slugs 23 thus ceases to be in engagement with the teeth 25 of the moving cheek-plate 13, and similarly, the locking slugs 52 of the hinge mechanism 6 likewise cease to be in engagement with the teeth 54 of the corresponding moving cheek-plate 14, since the locking cam 56 is coupled to the locking cam 29 via the link bar 8.

Nevertheless, in this position, the seat-back 4 is prevented from moving by the memory slug 44.

Figure 17:
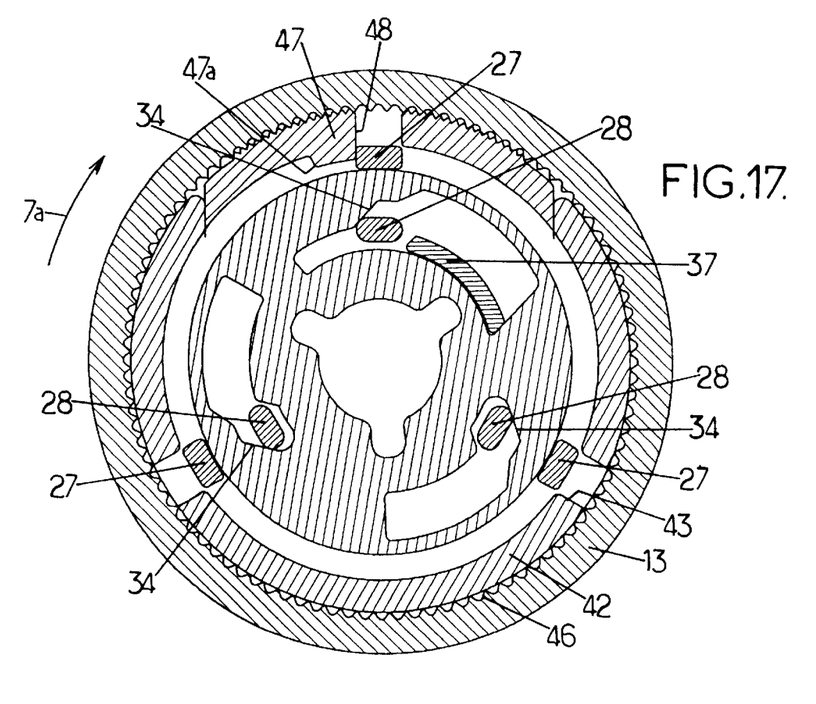
FIG. 17 is a view on line A—A of FIG. 3 showing the first hinge mechanism at the end of actuation of the control member which controls folding down forwards of the seat-back.

It is only at the end of the stroke of the handle 9 that the seat-back 4 is released, once the control plate 36, the plate 31, and the locking cam 29 have pivoted far enough for the pegs 27 of the locking slugs 23 to leave their radial guides 43, 48, as shown in FIG. 17.

It will be observed that during this movement, the drive finger 37 no longer interferes with the peg 28 engaged in the same cutout 32 as the plate 31, because the drive finger 37 is moved in the direction 7a such that the ramps 34 of said plate 31 can entrain the pegs 28 to the ends of said ramps 34.

The seat-back 4 can then pivot forwards under drive from the user, or more generally under the effect of springs inside said seat-back, such that the moving cheek-plates 13 and 14 pivot in the direction 7b opposite the direction 7a in the example described, with the cheek-plate 13 entraining the memory equipment 39.

Figure 18:
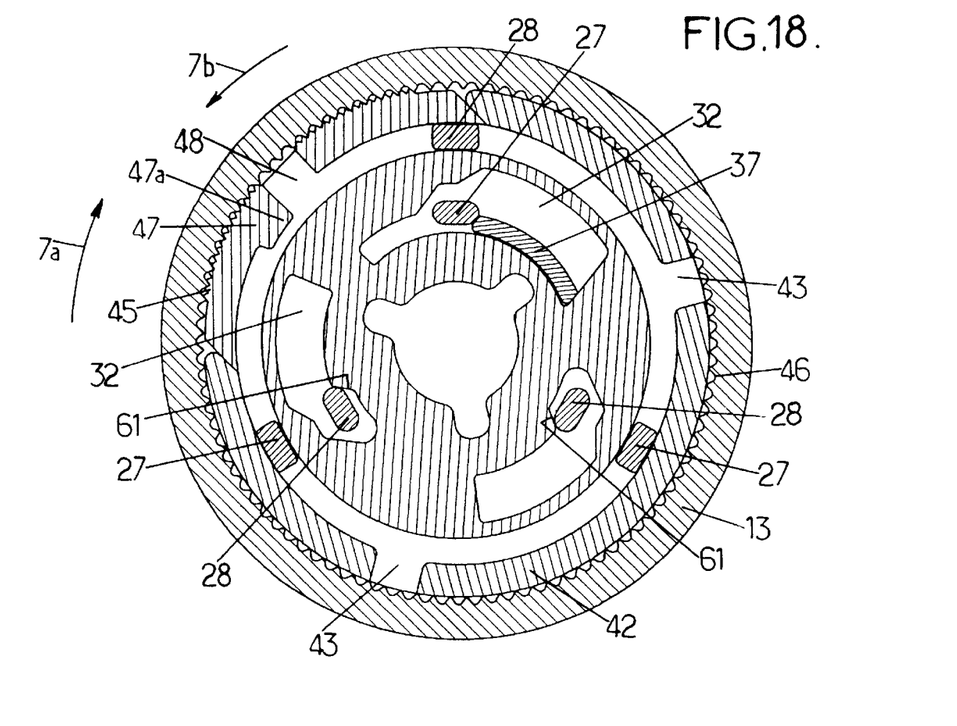
FIGS. 18 and 19 are section views respectively on lines A—A and C—C of FIG. 3 showing the first hinge mechanism while the seat-back is folded down forwards.
Figure 19:
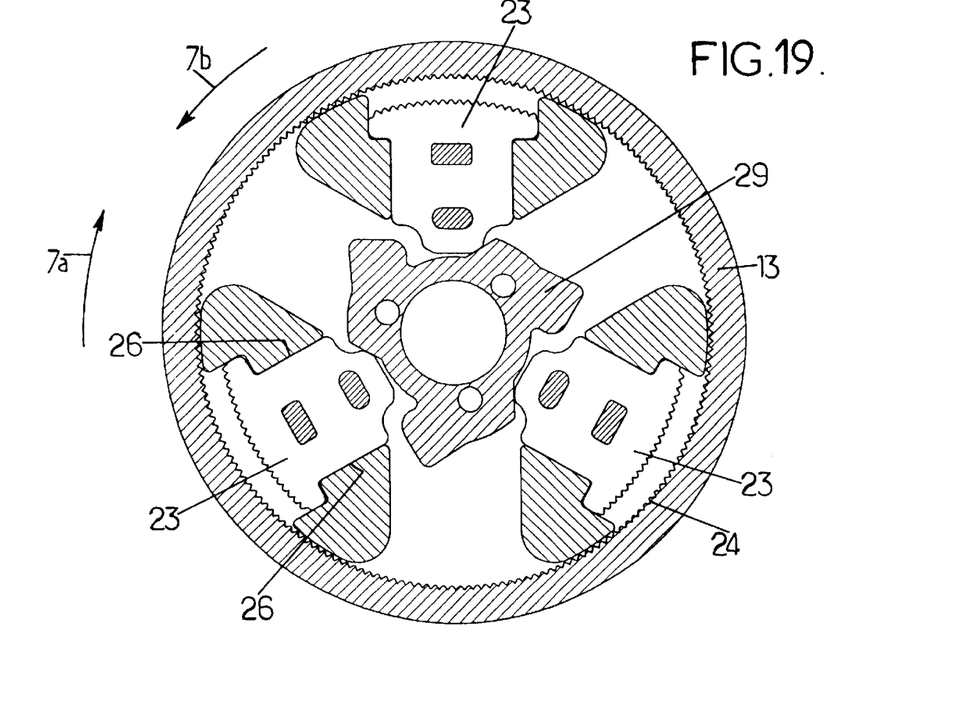

In this situation, as shown in FIGS. 18 and 19, even if the user releases the handle 9, the pegs 27 of the locking slugs 23 bear against the inside portions of the rims 42, 47, thereby preventing the locking slugs 23 from coming back into engagement with the teeth 25 of the moving cheek-plate 13.

In addition, after the handle 9 has been released, the control plate 36, the plate 31, the cam 29, the link bar 8, the cam 56, and the plate 58 are subject to a small amount of return movement in angular direction 7b, however this return movement is stopped by angular abutment of the drive finger 37 against the corresponding peg 28 and/or by the other two pegs 28 coming into abutment against projections 61 formed on the inside edges of the corresponding cutouts 32.

Because this return movement is thus limited so long as the seat-back has not been returned to its initial position, the locking slugs 52 of the hinge mechanism 6 are themselves prevented from coming back into engagement with the teeth 54 on the corresponding moving cheek-plates.

In contrast, when the seat-back 4 is raised after being folded down forwards, thereby in the example described causing the moving cheek-plates 13, 14 to pivot in angular direction 7a, the radial guides 43, 48 come back into register with the pegs 27 belonging to the locking slugs 23 while the abutment 47a belonging to the memory equipment comes into contact with the corresponding peg 27: the pegs 27 then engage again in their radial guides 43, 47 such that the locking slugs 23 return to the locked position, under the camming effect of the projections 61 and/or the end of the drive finger 37.

The control plate 36 is then free to return to its rest position, as are the plate 31, the cam 29, the link bar 8, the cam 56, and the plate 58: the locking slugs 52 of the hinge mechanism 6 then come back into engagement with the corresponding teeth 54, and also the memory cam 38 again acts on the projection 50 of the memory slug 44 to return said slug to the retracted position.

The seat 1 is thus again in its starting position, and the inclination of the seat-back 4 is as previously adjusted by the user.

We claim:

1. A hinge mechanism for fitting to a vehicle seat comprising a seat proper and a seat-back that is pivotable relative to the seat proper, the mechanism comprising:

first and second cheek-plates, one for securing to the seat proper and the other to the seat-back, said cheek-plates being pivotally mounted relative to each other about an axis of rotation, the second cheek-plate being permanently secured with a set of teeth extending over at least an arc of a circle centered on the axis of rotation and being radially inwardly directed;

at least one locking slug provided with a set of teeth suitable for co-operating with the teeth of the second cheek-plate, said locking slug being guided in radial sliding by a guide secured to the first cheek-plate, to slide between an engaged position in which the teeth of the locking slug co-operate with the teeth of the second cheek-plate to lock the mechanism, and a retracted position in which the teeth of the locking slug do not co-operate with the teeth of the second cheek-plate, said locking slug also including a first peg which projects axially towards the second cheek-plate;

a locking cam for controlling the sliding of the locking slug, said locking cam being urged by resilient means towards a rest position in which said locking cam places the locking slug in its engaged position;

a first control member for moving the locking cam from its rest position towards an actuation position in which said locking cam enables the locking slug to slide towards its retracted position;

means for displacing the locking slug from its engaged position to its retracted position when the locking cam passes from its rest position to its actuation position; and a circular guide mechanically linked to the second cheek-plate and co-operating with the first peg so as to hold the locking slug positively in its retracted position when said locking slug is in a predetermined range of angular positions relative to said circular guide, said circular guide having at least one gap in which the first peg can engage when the locking slug is not in said predetermined range of angular positions, then allowing the locking slug to slide radially outwards to its engaged position;

wherein:

the circular guide is formed by a rim belonging to memory equipment which is pivotally mounted relative to the first and second cheek-plates to pivot about the axis of rotation;

the gap of the circular guide forms a radial guide in which the first peg can slide radially, substantially without play in the circumferential direction;

the memory equipment further includes a memory plate and a memory slug, said slug being mounted to slide radially on the memory plate between an engaged position in which said memory slug co-operates with said second cheek-plate to prevent the memory plate from moving relative to said second cheek-plate, and a retracted position in which said memory slug does not co-operate with the second cheek-plate and allows the memory plate to turn freely relative to said second cheek-plate;

a control plate is pivotally mounted about the axis of rotation to pivot between a rest position which is fixed relative to the first cheek-plate and an active position, said control plate being resiliently urged towards its rest position and being capable of being moved into its active position by a second control member, and said control plate being shaped to enable the locking slug to move radially inwards to a disengagement position in which the first peg can disengage from its radial guide to slide against the circular guide when the control plate is placed in its active position, the control plate being connected to the locking cam with a certain amount of angular clearance, so that said control plate remains in its rest position while the locking cam is moved from its rest position to its active position by the first control member, and so that said control plate entrains the locking cam to its active position when said control plate is moved from its rest position to its active position by the second control member, means being provided to entrain the locking slug from its engaged position to its disengagement position when the control plate is displaced from its rest position to its active position, after a certain amount of angular lost motion in which displacement of the control plate does not entrain displacement of the locking slug;

the control plate is secured to a memory cam which co-operates with the memory slug to place said memory slug in its retracted position when said control plate is in its rest position, and to enable said memory slug to move into its engaged position during the angular lost motion of the control plate; and the memory slug is urged resiliently towards its engaged position.

2. A hinge mechanism according to claim 1, in which the control plate includes a stop member which co-operates with the locking slug to prevent the locking slug from moving to its disengagement position so long as said control plate is in its rest position.

3. A hinge mechanism according to claim 1, in which a spring is mounted on the memory plate to urge the memory slug towards its engaged position.

4. A hinge mechanism according to claim 1, in which the locking cam is secured to a rigid plate which extends radially between said cam and the second cheek-plate overlying at least a portion of the locking slug, the locking slug having a second peg projecting axially towards the second cheek-plate and penetrating in a cutout formed in said plate, said cutout being defined radially outwardly by a camming edge which co-operates with the second peg to move the locking slug radially inwards to the retracted position of the locking slug when the locking cam is moved to its active position by the first control member, and to the disengagement position of the locking slug when the control plate is moved to its active position by the second control member.

5. A hinge mechanism according to claim 4, in which the control plate includes at least one drive finger which penetrates axially into the cutout of the rigid plate towards the first cheek-plate, said drive finger thus connecting the control plate to the locking cam with the above-mentioned angular clearance.

6. A hinge mechanism according to claim 5, in which the drive finger is disposed in register with the second peg of the locking slug, radially on the inside of said second peg when the control plate is in its rest position in such a manner that the second peg of the locking slug comes into abutment against the drive finger, thereby preventing the locking slug from moving radially inwards to its disengagement position so long as the control plate is in its rest position.

7. A hinge mechanism according to claim 5, in which the drive finger is disposed to come angularly into abutment against the second peg of the locking slug when the locking slug is in the disengagement position, and when the second control member is released, then preventing the control plate and the locking cam from returning towards their respective rest positions.

8. A hinge mechanism according to claim 7, in which cam means are provided to urge the locking slug radially outwards when the slug is in its disengagement position and the second control member is released, so as to enable the first peg of said slug to engage in its radial guide when the seat-back is raised after being folded down forwards.

9. A hinge mechanism according to claim 1, in which an element secured to the locking cam is provided to come angularly into abutment against the locking slug when the slug is in its disengagement position and the second control member is released, so as then to prevent said locking cam from returning towards its rest position.

10. A hinge mechanism according to claim 1, in which the memory slug is in the form of a plate which extends in a generally radial plane in common with the memory plate, the circular guide having both a first portion which is secured to the memory slug and a second portion which is angularly complementary to the first portion and which is secured to the memory plate, said first and second portions of the circular guide being at equal distances from the axis of rotation when the memory slug is in its engaged position.

11. A hinge mechanism according to claim 1, in which the circular guide has an abutment projecting radially inwards at the gap of said circular guide, from one side only of said gap so that when the locking slug is in its disengagement position, the second cheek-plate can pivot in a first angular direction and then in an opposite, second angular direction until the first peg of the locking slug encounters said abutment of the circular guide, after which said first peg can again be engaged in its radial guide.

12. A hinge mechanism according to claim 1, further including a spring which urges the second control member towards a position which corresponds to the rest position of the control plate.

13. A hinge mechanism according to claim 1, in which the memory slug has a set of teeth which is adapted, when said memory slug is in its engaged position, to co-operate with a complementary set of teeth belonging to the second cheek-plate.

14. A vehicle seat comprising a seat proper and a seat-back pivotally mounted on the seat proper by means of at least one hinge mechanism according to claim 1, in which one of the first and second cheek-plates of the hinge is secured to the seat proper and the other is secured to the seat-back.

15. A vehicle seat comprising a seat proper and a seat-back mounted to pivot on the seat proper by means of two hinge mechanisms disposed on either side of the seat, the hinge mechanisms comprising a first hinge mechanism according to claim 1 having one of its first and second cheek-plates secured to the seat proper and the other to the seat-back, and a second hinge mechanism which comprises:

first and second cheek-plates, one secured to the seat proper and the other to the seat-back, said cheek-plates being mounted to pivot relative to each other about the above-mentioned axis of rotation, the second cheek-plate of the second hinge mechanism being permanently secured to a set of teeth extending over at least an arc of a circle centered on the axis of rotation and having teeth that are radially inwardly directed;

at least one locking slug provided with a set of teeth suitable for co-operating with the teeth of the second cheek-plate of the second hinge mechanism, said locking slug being guided in radial sliding relative to the first cheek-plate of the second hinge mechanism between an engaged position where the teeth of the locking slug of the second hinge mechanism co-operate with the teeth of the second cheek-plate of the second hinge mechanism to lock said second hinge mechanism, and a retracted position in which said teeth of the locking slug do not co-operate with said teeth of the second cheek-plate;

a locking cam to control sliding of the locking slug of the second hinge mechanism, said locking cam being connected to the locking cam of the first hinge mechanism by a rigid link bar and being urged by resilient means towards a rest position in which said locking cam of the second hinge mechanism places the locking slug of the second hinge mechanism in its engaged position, said rest position corresponding to the rest position of the locking cam of the first hinge mechanism; and means for moving the locking slug of the second hinge mechanism from its engaged position to its retracted position when the locking cam of the second hinge mechanism passes from its rest position to an actuation position which corresponds to the actuation position of the locking cam of the first hinge mechanism.

* * * * *